United States Patent [19]

Labrador

[11] Patent Number: 5,056,447
[45] Date of Patent: Oct. 15, 1991

[54] REIN-DEER KITE

[76] Inventor: Gaudencio A. Labrador, 1312 Leaf Terr., San Diego, Calif. 92114

[21] Appl. No.: 255,657

[22] Filed: Oct. 13, 1988

[51] Int. Cl.⁵ .............................................. F03D 5/02
[52] U.S. Cl. .................................. 114/39.1; 114/102; 244/153 R; 244/24; 416/8
[58] Field of Search ...................... 114/39.1, 39.2, 90, 114/89, 102, 103, 61; 212/71; 416/8; 415/5; 244/153 R, 24

[56] References Cited

U.S. PATENT DOCUMENTS

| | | | |
|---|---|---|---|
| 3,326,392 | 6/1967 | Rock | 212/71 |
| 3,933,110 | 1/1976 | Jamieson | 114/61 |
| 3,937,166 | 2/1976 | Lindsay | 114/61 |
| 4,116,151 | 9/1978 | Guthrie | 114/39.1 |
| 4,124,182 | 11/1978 | Loeb | 416/8 |
| 4,708,078 | 11/1987 | Legaignoux et al. | 114/102 |
| 4,756,666 | 7/1988 | Labrador | 416/8 |

*Primary Examiner*—Sherman Basinger
*Assistant Examiner*—Stephen P. Avila

[57] ABSTRACT

What has been created is a new form of an equipment/-kite that carry weight in mid-air regardless of fuel and-/or wind, which converts the wind energy into mechanical energy by acting as a sail in a multi-level formation, which is in the form of a large flat air balloon ½ acre to more than 5 acres wide that floats in the air concave downward against the wind, which functions as a large kite in the presence of wind—soaring upward instead of being blown down which may be constructed into a multi-level balloon kite from ground to the highest altitude of wind to carry several rotary blade windmills on each kite or top pull transportation on land or on water or on aerial cable railway; to carry electric wire conductors up into the clouds to collect electricity from the clouds; to carry lamps, advertisements, and observatory instruments to high altitudes; to serve as sail for large type of windmills in a configuration similar to the United Sail Windmill under U.S. Pat. No. 4,756,666 and as illustrated by herewith FIG. 9 showing multilevel kites pulling an elongate closed-loop Power Chain erected on land or on ocean. Created also is a new control system for said kite in the form of a Triple "T" Structure and an Elliptical Monorail Track, as shown in FIGS. 5, 6, and 7.

26 Claims, 9 Drawing Sheets

REIN-DEER KITE

BACKGROUND OF THE INVENTION

1. Field of the Invention

This invention relates to weightless balloons that are made to have flat wide faces in order to make it function as a large kite that can fly with out the wind and carry loads with out the wind. It is designed to fill the need of an air-born transportation without the use of fuel, to fill the need of balloon that can be maneuvered transversely and obliquely against the wind, to provide a balloon that can soar high into the air when tied to an anchor on the ground instead of being blown down when there is wind it being a kite, to tap the energy of the high altitude wind and make it available at ground level, and to provide a multi-level balloon-kite wind sail that makes the maximum wind contact for a sail boat It is a design to produce a reverse action against overturn of the sailboat boat when same is being towed by a kite-sail. It is a design that enables a sail boat to cruise the ocean safely during the storm to take advantage of the high speed winds, it being that the passenger is air-born suspended up from the kite, the boat being steered by radio or remote control. It is also a new technology by which the maximum size of sail can be adapted for a minimum size of boat. It is also a new technology by which man can cruise over the land against the wind by means of kite. It is a new technology by which a windmill is-driven by a kite.

2. Description of the Prior Art

The existing balloons today that are being used as an air-born transportation are the spherical and /or the elliptical forms that just drift along the flow of the wind and cannot be maneuvered to cruise transverse to the wind, they being not in the form of a wide-faced kite, and none of those balloons have ever been tied to a moving anchor on the ground to change the path of the drifting balloon. None of those balloons have ever been used to function as a sail, and none of those sails has ever carried an air-born passenger—leaving the sail boat unoccupied. The existing sail today which was designed and put to use since the times of Ferdinand Magellan and Christopher Colombus, is a framed fabric that stands against the wind thru a strong mast that is held vertical by the counter overturning stability of the vehicle. So, the maximum wind contact that can be provided to move the vehicle depends upon the ability of the vehicle to stay up-right against the overturning effect of the sail upon the vehicle. The larger the sail, the larger is the size of the vehicle required to take hold of the large sail upright. There were attempts to use the multi-level kite as a sail but never been used to practice due to the failure of the control systems available.

The first reference prior art is the "Propulsive Wing With Inflatable Armature" invented by Dominique M. Legaignoux, dated Nov. 24, 1987, which is a light kite in the form of a segment of a sphere, having a tubular structural frame of flexible materials inflated with compressed air to make said frame stiff and light weight strut which is covered by light sheets forming a large envelop that contains the said strut. Said envelop forms the lower and upper surface of the kite but not inflatable. The compressed air content of said frame can be replaced by a compressed lighter gas to make the wing able to float more on water and insubmersible in water in order to facilitate the start-out flight when sailing over the waters. This wing tapers to a tip on the left and on the right sides that serves as the control tie point for the left and right control ropes the lower ends of which are connected to each other to form a loop that passes thru a swivel block/pulley that is attached to the load being towed. The wing can be maneuvered to the left and to the right by making the left control rope shorter and vise-versa by making the loop of said control rope roll thru said pulley. It is to be used for traction and lifting.

This propulsive wing , as a new invention, has only one advantage over the existing ordinary kite—that is—it floats on water and is insubmersible in water—which special feature makes it easy to take-off from the water to serve as sail or to suspend a load while there is sufficient wind. The old ordinary type of kite can also take-off from the water provided it is on board of a long vessel or on board of a second floating vessel initially, and can also perform all the jobs that this subject wing can do after take-off. While said wing has good special features and advantages to some extent, it still has disappointing defficiencies and lack of essential features, as follows:

1. That it is not made of balloons, hence, it cannot float up in the sky to carry loads when there is no wind;
2. That the inflatable armature/frame is not made of honeycombs of air tanks, hence, the whole wing will collapse when said frame is punctured by gun shots;
3. That it is not able to sail against the wind there being no special moving anchor towed by it to the desired direction;
4. That it is not able to fly at higher or lower angle automatically, there being only one tie point on each of its sides, said kite has to be brought down on to the water to attach its flap tail by zipper to increase its lifting power;
5. That the objective of the inventor is to build a wing which means to say that he is working on a wide faced material that bumps or deflects large quantities of air mass in order to produce a lifting force upon said wing, which means to say that, although, as he said, the compressed air inside the armature can be replaced by pressurized lighter gas, he does not mean or never mentioned that he wanted to build a balloon that can float up in the sky even without wind, hence, the said envelope is not made inflatable. What has been solved actually by this prior art is only the ability of said-wing to start up its flight or able to take-off from the water—by initially sitting afloat on the water facing the wind. It does not solve the complex problems of a multi-level kite sail;
6. That this Propulsive Wing cannot be constructed into a multi-level kite-sail;
7. That this prior art does not show or does not demonstrate how it can be connected to a sail boot or to a load, hence, it cannot be used as a sail for a sail boat, neither can it be used to lift vertical loads.
8. That only one-half (1/2) of its total intrados face is actually effective in deflecting the wind because said wing is semi-circular shape such that the wind bumped by the left and the right section is deflected towards the center of the arch due to the fact that air is compressible, and that the pressure built-up along section B-C-D tends to scape towards the left and right rear, partially avoiding the deflector flap D-E, because the left and the right sections of said wing are narrow, hence, a deflector wing should be a flat square face with peripheral side walls to make it concave to the wind, as shown in FIG. 1 of the herewith presented application, the "LABRADOR REIN-DEER KITE".

The second reference prior art is the WIND POWERED APPARATUS, invented by John Guthrie, of Canada, with U.S. Pat. No. 4,116,151 dated Sept. 26, 1978. This is a horizontal array of vertical solid foils which are independently and spacedly erected on a large horizontal solid bar that is being horizontally turned around to orient said foils to maximize deflection of the wind. This apparatus is specially designed to serve as sail for a boat. Said foils can be bunched closely together towards one end of said horizontal bar footing when not in used. Said foils can also be rotated in accordance with the direction of the wind in a synchronous maner. The mechanical design of this invention is good, but the following deficiencies prevent the commercial use of this apparatus:

1. That it is in error in relation with its utility purpose because the foils are made of narrow blades which are applicable only to high speed turbines to drive air instead of being driven by wind. The most effective wind deflector to develop pressure on the sail is in the form of a wide large square concave sail, because wind pressure upon the sail approaches zero (0) when the width of the sail approaches zero;
2. That it is the heaviest and most massive construction of sail because each foil has to be able to stand by itself against the wind, and when it is tilted to one side it will go on pressing the boat to that side until the boat is turned over, hence, this kind of sail cannot be constructed into a large sail relative to the size of the boat;
3. That it is the most expensive and most inefficient way of constructing a sail boat because it requires a much larger boat to hold this kind of sail than a boat that holds a light fabric sail;
4. That this kind of sail is not a kite type as proposed by the herewith presented application.

The third reference prior art is the "FLOAT CONNECTION ASSEMBLIES FOR MULTI-HULLED BOATS" invented by Ian Lindsay Farrier with Pat. No. 3,937,166 dated FEB. 10, 1976 which is a construction of a 3-hull boat for more stability against the over turning effect of the sail. Theoretically, the stability of this kind of boat is second to that of the Catamaran type, but neither of these two types can sail thru the ocean during the storm or when the water waves are very rough, because of the following deficiencies:

1. There is no counter-weight attached on both sides of the boat to prevent overturning when the wind is too strong;
2. That there is no vertical wall-blade attached below the keel to serve as a moving anchor to prevent side-ward drifting specially when the sail is in the form of a large kite;
3. That this boat is very vide due to the presence of the left and the right hulls, which configure makes the boat very jerky as there will be sudden lift on the right and sudden sinking on the left hulls by the large water waves;
4. That the largest buoyancy of this type of boat is at the center of the hull which makes either end of said boat to be over-hanging high over the valleys of the water waves and then the front end will make a high drop after crossing the water wave, so this boat cannot sail during the storm;
5. That there being no counter-weight in the form of a pipe filled up with water attached to the bottom or both sides of the hull, this boat will be lifted up out of the water by the large kite when the wind is very strong, if the kite is used as sail for this boat;
6. That this type of boat, being multihulled, offers too much resistance against sailing thru the water, there being three (3) separate hulls to plow the waters;
7. That this type of boat is certainly not the proper boat to use the Labrador Rein-Deer Kite as sail, there being no designed control structure/connector that can be used to maneuver the kite sail.

The fourth reference prior art is the "Plural-Hull Sailing Craft and Methods for Sailing Craft" invented by Robert S. Jamieson, under U.S. Pat. No. 3,933,100, dated Jan. 20, 1976, which is a two-hull boat similar to that of the catamaran type, wherein a third hull is mechanically movable to align longitudinally to the rear end of the left or the right hull in order to increase buoyancy at the leeward hull to prevent overturning of the boat due to wind force on the sail, and wherein the sail is just an ordinary triangular framed fabric attached to a mast. This design of a sail boat, like the catamaran type, has good stability in so far as when the ocean waves are peacefull, and, since it is also of a multi-hulled boat, it has all the deficiencies as enumerated in the herewith preceding third reference prior art, in the preceding pages hereof. Further, the sail being the ordinary type that is supported by a mast, its performance is too far below the performance of the self supporting balloon kite.

There have been many proposals for the construction of the most advantageous sail and for the most advantageous sail boat that included the multi-level kite sails, but none has come up with the right solution to enable man to sail thru the storms in the ocean without endangering the passenger/ operator with the turbulence of the water waves created by the storm, wherefore, the herewith presented new invention has been created, which is hereby named the "LABRADOR REIN-DEER KITE".

SUMMARY OF THE SUBJECT INVENTION

The "Labrador Rein-Deer Kite" is created:
(a) To solve all the aforementioned problems or impediments encountered by the foregoing reference prior arts;
(b) To introduce new technology for making a kite that has maximum activeness with the wind by making it flat, rectangular, and concave to the wind; a new technology for making a balloon that functions as a kite; a new technology for making a balloon-kite that safely functions as an air-borne transportation; a new technology for making a Sky-Bike which is a flat balloon that is paddled manually by the passenger and which is further powered by Solar Cells; and a new technology for the creation of an air-borne propulsive force;
(c) To introduce a new technology for tapping the energy of the high altitude winds and to make such energy available to ground level;
(d) To introduce a new technology for making the various control systems for multi-level kites that function as air-borne sails for the purpose of maximizing contact with the wind at higher altitudes to drive a sail vehicle or machinery;

(e) To introduce a new technology for making a moving anchor for a kite to make it cruise obliquely against the wind over the ocean and/or over the land;

(f) To introduce a new technology for the construction of a mono-hull sail boat that cruises safely across the ocean during the storm, using said kite as sail;

(g) To introduce a new technology in using multi-level kites to drive a windmill, or to pull transportation along aerial cable railway, or a no fuel air-borne tractor;

(h) To introduce a new technology for gathering electricity from the cloudes and how to make use of such energy.

To attain the foregoing objectives, there are various new inventions and new configurations created and hereby presented and applied for patent protection, such as the following:

1. A flat, rectangular, wide-faced balloon (½ acre to more than 5 acres wide for maximum wind contact), having downward trapezoidal side walls and a deflection flap at the rear to make it into a weightless kite that is concave to the wind, which is made up of honeycombs of smaller balloons of different shapes and sizes, which is maneuvered against the wind by tilting it left or right, which kite is able to lift loads without the assistance of the wind, as illustrated by part #1 in FIG. 1, the REIN-DEER KITE;

2. A weightless kite of the same configuration as the above described kite, but which is simply constructed as a framed light cloth/fabric having a plurality of lifter balloons attached to its top face (instead of honeycomb balloons), as illustrated by FIG. 5-A, Parts #1, #3, & #6, as an alternative method of constructing the "Labrador Reing-Deer Kite";

3. An Air-borne transportation made up of multi-level assembly of said Rein-Deer Kite that carry an air-borne passenger capsule, said kite tows a moving anchor along its desired flight path, as illustrated in FIG. 5, FIG. 5-A, and FIG. 6;

4. A remote controlled Moving Anchor in the form of a thin wall blade that bites and cuts thru the water and suspended under water by a floater pipe that has forward and reverse cruising ability, said anchor being towed by the kite to guide the flight path of said kite, as illustrated by part #24 and #22 in FIG. 5-A and FIG. 6;

5. A remote controlled Rotary Spike Moving Anchor that bites and rolls on the land and on the ice to guide the flight path of said kite over the land and over icy regions, named "Tarantula Land Cruiser", as shown in FIG. 8, Part #31 and #32;

6. A Calibrated Counter Weight in the form of a pipe filled up with water to serve as counter weight that prevents said moving anchor from being lifted out of the water by said kite, said weight stops pulling the floaters down when it gets submerged into the water, as illustrated by part #23 in FIG. 5-A and FIG. 6;

7. A structural "T" Control Bar System, used to maneuver the said Rein-Deer Kite thru its control ropes that tilt said kite left or right and up or down, corresponding to the cruising needs of the kite, as illustrated by part #9, 10, & 11 in FIG. 5 and FIG. 6;

8. A Triangular Control Arm Connector, attached to the base of the mast of the boat, that takes hold and manipulates said "T" Control Bar, and which keeps the boat up-right against the over-turning force from said Kite-Sail, as illustrated by parts #13, 14, & 15 in FIG. 5 and in FIG. 6;

9. A Pipe Boat, that is 90% submerged, having submarine capability, in the form of a vertical stack pile of horizontal pipes, having the lower pipes filled up with water to serve as ballast weight, having its lowest part of the stack a long thin heavy wall that serves as anchor blade against sideward drifting and to serve as a vertical stabilizer for said boat, having its two ends provided with additional short floater pipes on top of said stack to transfer its buoyancy towards the ends of said boat in order to minimize oscillation of said boat by the action of the water waves, as illustrated by parts #22, 23, 24, & 26 in FIG. 6;

10. An Elliptical/Circular Mono-Rail Track Connector, that is horizontally disposed on top of a boat (mono-hull or double hull) to replace said Triangular Control Arm Connector, that has an assembly of roller wheels that links said track to the bottom tip of said "T" Control Bar System, and which roller grips and runs around said track as the boat turns around in its varying orientation with the kite-sail, as illustrated by parts #28, & #30 in FIG. 7 and FIG. 8;

11. A boat made up of pipe (mono-hull or double hull), which has larger diameter at both ends (at its outer 3rd or outer 4th) and smaller diameter at its half middle section, such that said middle sections gets submerged into the water waves when(crossing same, in order to minimize oscillation, as illustrated by Parts #23 and #26. Said boat is designed to cruise reversed and forward;

12. A United Sail Windmill wherein the sails are made up of multi-level Rein-Deer Kite that tugs an aerial cable chain over the ocean and/or over the land as illustrated by the herewith accompanying FIG. 9, in a configuration similar to FIG. 6 and FIG. 7 of the U.S. Pat. No. 4,589,146;

13. An Aerial Windmill that is in the form of multi-level Rein Deer Kite that carry a plurality of rotary blade windmills up in the sky, as illustrated by Part No. 27 in FIG. 10;

14. A new method of gathering electricity from the clouds, in the form of a wire conductor brought up to the level of the clouds by the Rein-Deer Kite, the bottom end of said conductor being connected to a large capacitor enough to store the energy of the lightning-bolt and then passed thru an electrolyzer to produce hydrogen gas fuel or to recharge a battery, as illustrated by parts #50, 51, & 52 in FIG. 10;

15. A Sky Bike that floats up in the air, which is moved forward and backward by the manual power of the passengers by foot pedal thru rotary blade propellers that are also made of balloons that float up in the air. The main body of said Sky Bike is a vertically disposed rectangular flat honeycomb balloon on the center top of another horizontally disposed rectangular flat honeycomb balloon. Its top and side surfaces are converd with Solar Cell to help the passengers power the propellers;

16. A Balloon Kite used for traction or to provide an Air-borne propulsive force to pull iceberg or any floating materials on water and to pull materials on railroad track;

17. A Vertical Balloon-Wall floating up at the level of the clouds, used to stop and/or to move the clouds to a desired concentration place where the rain is needed.

This new invention is relevant to the prior arts on the following points:

a. It eliminates the problems of overturning the boat or the vehicle that carry the large sail;
b. It provides the solution for the control systems for kites being used as an air-borne Tractor;
c. It provides solution for an air-borne transportation that does not use fuel, a kite that cruise against the wind;
d. It provide solution for tapping the high altitude winds to make such energy available to ground level;
e. It provides the solution for sailing on the ocean safely even in the presence of storms;
f. It provides the solution for deploying an air-borne propulsive force, that is parked up in the sky when there is no wind, and which is used but not limited to pull materials on water, on land, on aerial railway, on snow, and/or to lift loads up in the sky even without the assistance of the wind, and/or to pull an elongate closed-loope drive chain as part of a large windmill.

There are many designs of balloons that carry passengers up in the sky but unfortunately they are just drifting helplessly along the direction of the wind current. In the herewith subject invention, the Rein-Deer Kite presents a balloon that moves transverse and/or obliquely against the wind.

It should be noted at this point that the uses of this new Rein-Deer Kite is not limited to the above enumerated configurations.

DESCRIPTION OF THE PREFERRED EMBODIMENTS

Figure 1:
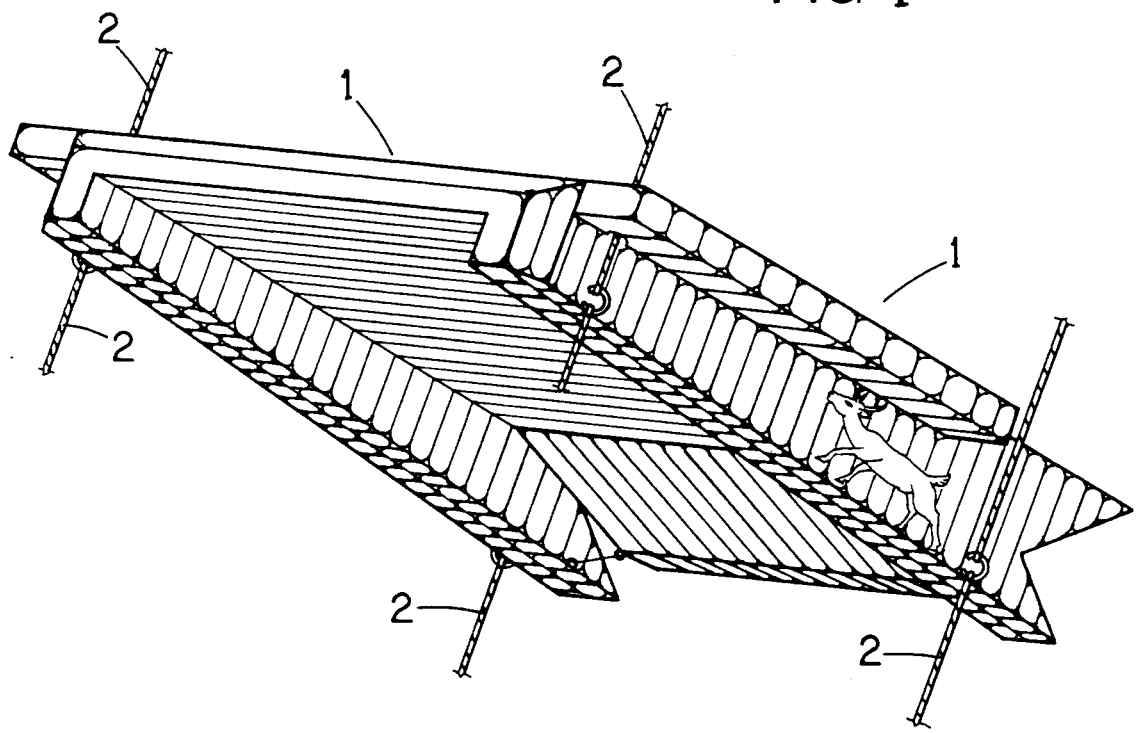
FIG. 1 illustrates the basic honeycomb construction of the flat balloon kite that is concave to the wind.

Accordingly and pursuant to the objectives of this invention, as enumerated in the summary, the following new designs and embodiments are created to provide the most appropriate technology which can be more understood by further reading the descriptions of the figures, to wit:

FIG. 1 illustrates the embodiment of honeycomb balloons of various sizes and shape to form a large flat balloon that has downward trapezoidal left and right side walls to make it concave against the wind and to provide aerodynamic stability. This resulting configuration is named the -"Rein-Deer Kite" which is designated as Part No. 1. Part 2 is a flexible light rope attached to the four control points of said kite to hold it against the wind. Said rope may be extended far beyond the top of said kite to hold the next higher level of kites. The wall at the rear is a deflection flap for lift. Note also that in FIG. 5-A, the trapezoidal left and right side walls of the kite are extended beyond the kite's rear end to further add more aerodynamic stability to the kite.

Figure 2:
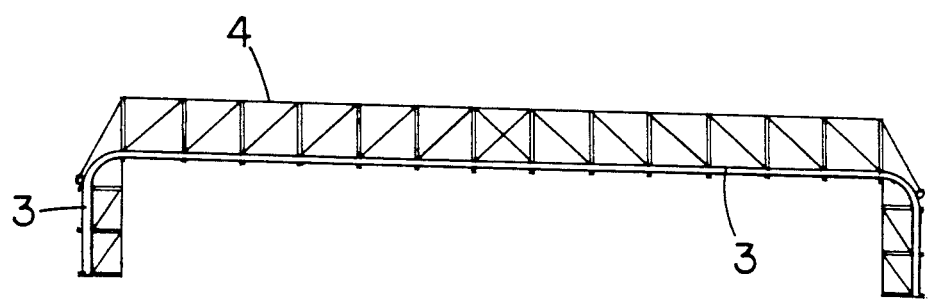
FIG. 2 illustrates the simple construction of a structural frame that makes the Rain-Deer Kite rigidly flat.

FIG. 2 illustrates the embodiment of a truss structure in an inverted "U" shape to serve as framework for the Rein-Deer Kite to make said kite rigidly flat and to make the side walls stay in correct posture. Part 3 is a light aluminum pipe, and part 4 is a light string/rope that is strung parallel to and separated from part 3 by short posts to form the truss. Such embodiment may be replaced by pressing together the lower layers of honeycomb balloons to form a compressive material at the bottom part of said kite. In another embodiment, several strings may be tied to the bottom face of the kite (within the middle half of its face) and tied down to the main control ropes of the kite to prevent the middle part of the kite being blown upward by the wind pressure. In another embodiment said part 3 may be in the form of styrofoam bar that is internally reinforced by nylon strings that set an initial compression in said foam bar.

Figure 3:
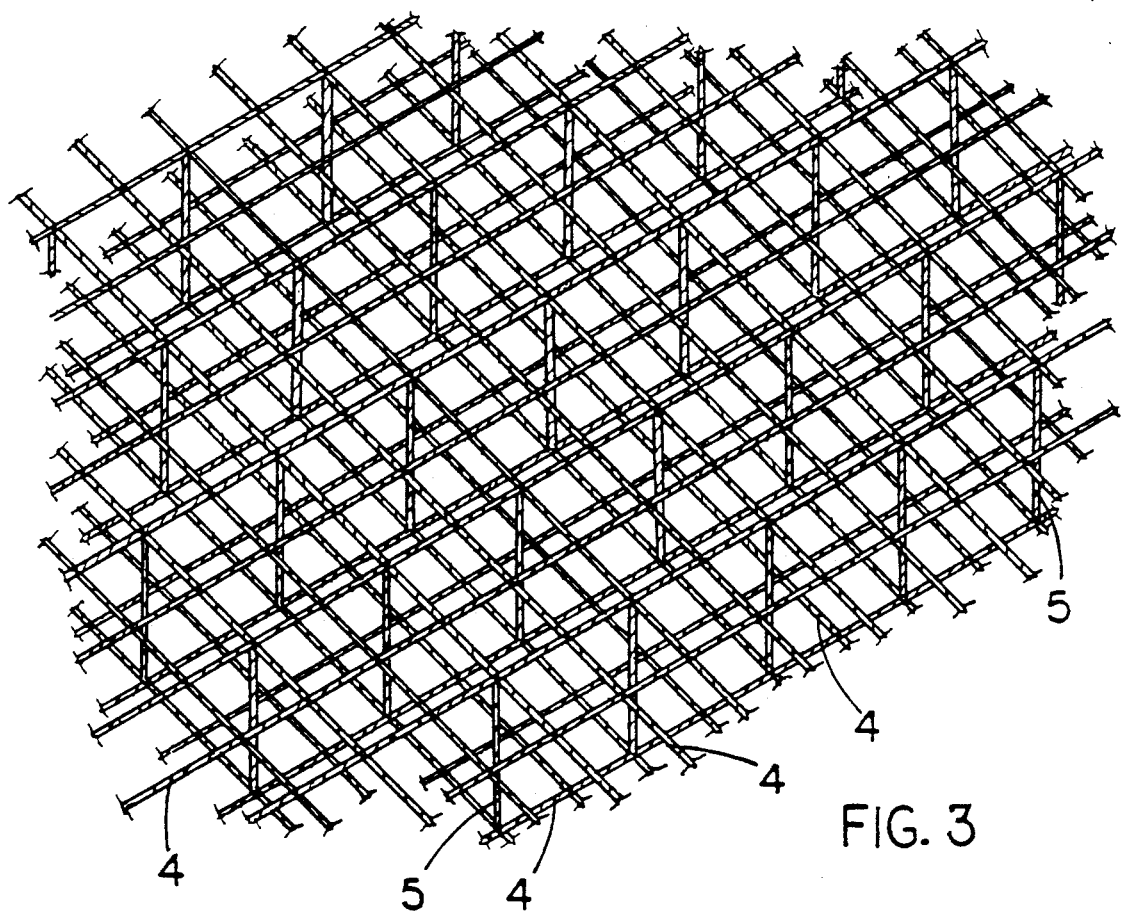
FIG. 3 illustrates the construction of a double layer of a string network to house the individual balloons in separate adjacent compartment to produce a wide thin plate of a honeycomb balloon.
Figure 4:
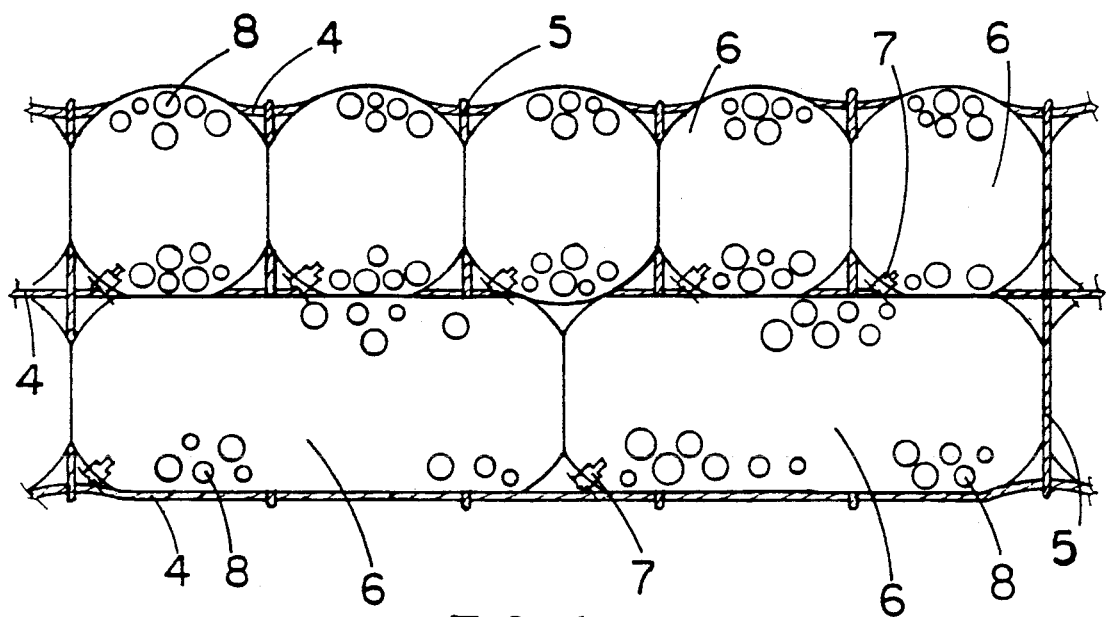
FIG. 4 illustrates in detail the construction of a honeycomb balloon containing tiny free flying balloons to automatically plug up leaks.
Figure 5:
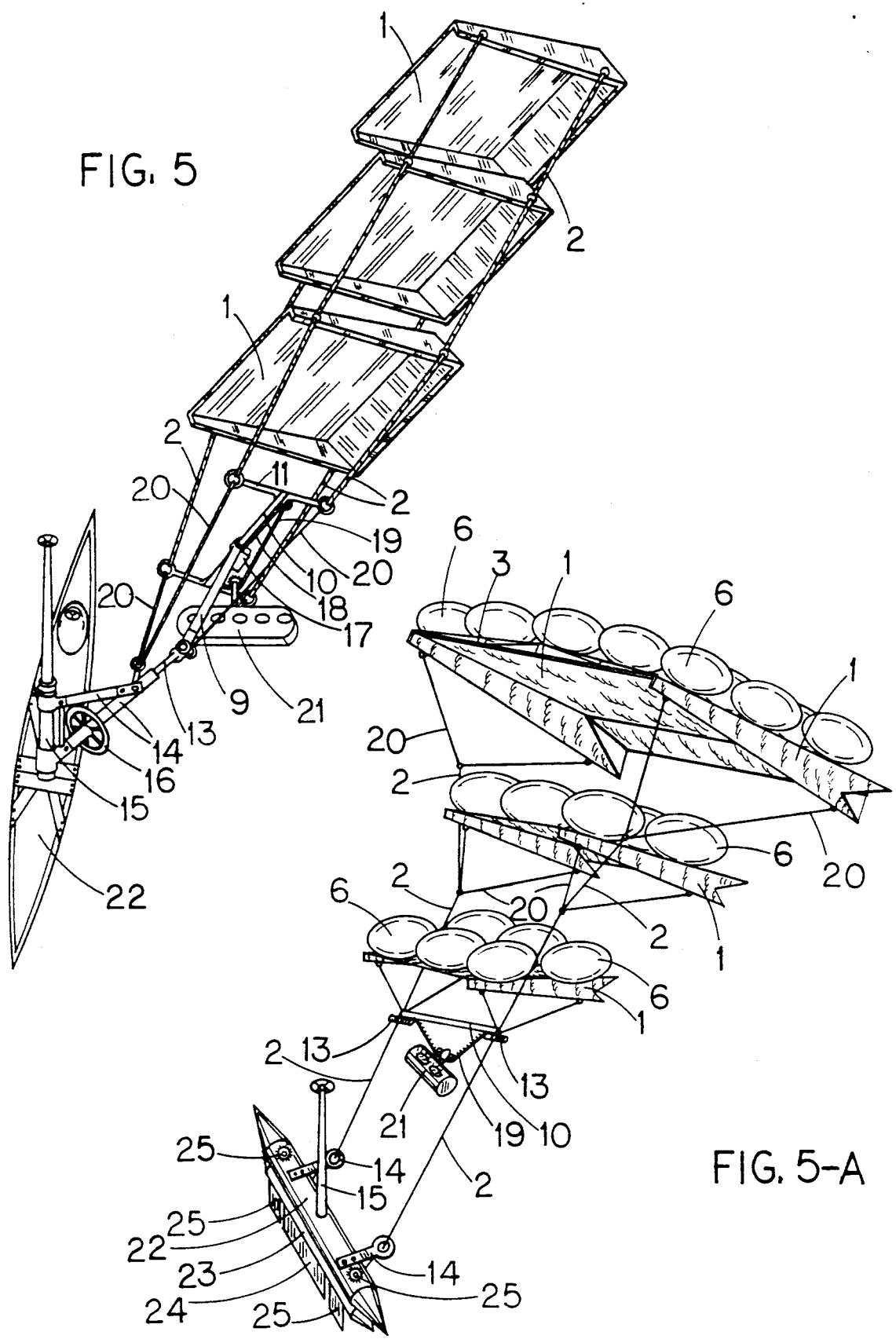
FIG. 5 and FIG. 5-A illustrate how a mono-hull boat can be pulled on water by a multilevel Rein-Deer Kite without the danger of overturning, wherein the operator is air-borne up in the kite, not down on the boat.

FIG. 3 illustrates the embodiment of several strings/straps part 4 in two or more layers separated by vertical strings part 5 to form honeycomb chambers that entrap the individual said gas container small balloons;

FIG. 4 illustrates the embodiment of a honeycomb balloon consisting of spherical and elongated small balloons part 6 that are held in place by strap 4 and 5. Each small balloon contains automatic gas supplier nozzle part 7 and tiny bubble balloons that can be blown around by the nozzle in case of gas leaks which will be pluged up by said tiny bubbles 8. The small balloons part 6 may be made of light plastic materials and placed inside light cloth bags in tight fits to reinforce said plastic balloons;

FIG. 5 illustrates the embodiment of a multilevel Rein-Deer kite showing the configuration of its control system in order to make it fly to the desired direction by towing a mono-hull boat #22 as an anchor that is moving. Part 9 is the main "T" control structure, which holds and can tilt the auxiliary "T" control structures #10 and #11 to the left and to the right. Part No. 12 is the upper end of Part 9, which contains an electric motor gear to spin #10 so that #11 will (thru rope 2) tilt up the front end of the kite to make it fly to higher angle of elevation, or will tilt down the front end of the kite to make it fly at lower angle of elevation. The steering wheel 16 spins drive bar 13 which in turn spins #9 to tilt the left bar #11 lower and tilt right bar #11 higher to make the kite fly at 45 degrees angle to the left of the wind thereby making the boat sail against the wind to the left. Turning the steering wheel 16 to the right will make the kite fly at an angle to the right of the wind thereby making the boat sail reverse to the right against the wind. Part 17 is a weight run by an electric motor to move along the straight gear 18 to tilt the kite left or right thru the auxiliary "T" control structure 10. Gear chain #19 is a suspension cable railway for the passenger capsule#21, which allows said capsule to travel left or right along and under bar #10 to replace the function of #17 in case of failure. Part #15 is a very strong pipe bar that serves as mast for the boat, which extends down to the bottom keel of the boat to hold the boat rigidly square with it. It should be born in mind that the kite #1 carries the vertical loads and that 75% function of the boat #22 serves as a moving anchor on the water to guide the kite #1 to fly along a desired path of travel. Part #14 (lower bar) is connected rigidly at right angle (90°) with the mast #15 and forms a right-triangle with bar #14 (upper bar). The four control ropes #20 are made adjustable to replace the function of part #12 in case of failure to fix the angle of elevation flight of the kite #1. As an indispensable functional part of a boat, a rudder #25 is provided at the bottom front and another one at the bottom rear of the boat #22, either one becomes neutral when the other is working. Said triangular arm structure #14 is free to—rotate around the mast #15 to keep the kite #1 in correct posture with the wind while the moving anchor/boat #22 makes a turn around. Drive bar #13 may be made telescopic to adjust the safe guard against overturning effects of the kite #1 upon the boat #22. A longitudinal thin wall—is provided under the boat's keel to serve as anchor blade that cuts under water to prevent the boat #22 from being pulled sideward by the kite #1. When there is storm on the ocean the boat #22 is vacated by the operator who must stay in the air-borne capsule #21 where the remote control system is installed. The boat #22 is designed to be 90% submerged on still water to minimize oscillation by going under the surfs. The triangular structures #13, 14, #15 and the "T" control structure #9, 10, & #11 are aligned along the longitudinal length of said boat 22 when the kite #1 is taken out.

FIG. 5-A illustrates an embodiment of a multilevel Rein Deer Kite that is used as an air-borne transportation:

Wherein the angle of elevation of its flight is fixed at about 30° to 50° above the horizon during its flight, due to limited control system, but a fix elevation is already sufficient as it is done by the sling #20;

Wherein a pair of guide ropes #2 (left & right) replaces and takes the function of said Triple "T" control structure #9, #10, #11, & #13, which is used to maneuver said kite;

Wherein a pair of horizontal BarHolder #14 replaces and takes the function of said Right Triangle Arm #13, #14, & #15, each of which holds the lower end of said Guide Rope #2 thru which the Kite #1 pulls the Boat#22, and which makes the said boat stay at erect posture when being pulled by said kite;

Wherein said kite is constructed just out of plain light cloth fabrics reinforced at its back by a network of strong nylon strings, which is framed up by the frame shown in FIG. 2; to minimize the cost of construction;

Wherein several lifter balloons #6 are attached to the back/top of said kite and hidden from the wind, said balloons #6 being of various sizes arranged from front to rear to reduce wind resistance;

The moving anchor #22 to #25 is a 90% submerged (on still water) boat made of pipes in stack to minimize oscillation by making it cruise under the water waves. It is designed to have forward and reverse cruising ability.

Figure 6:
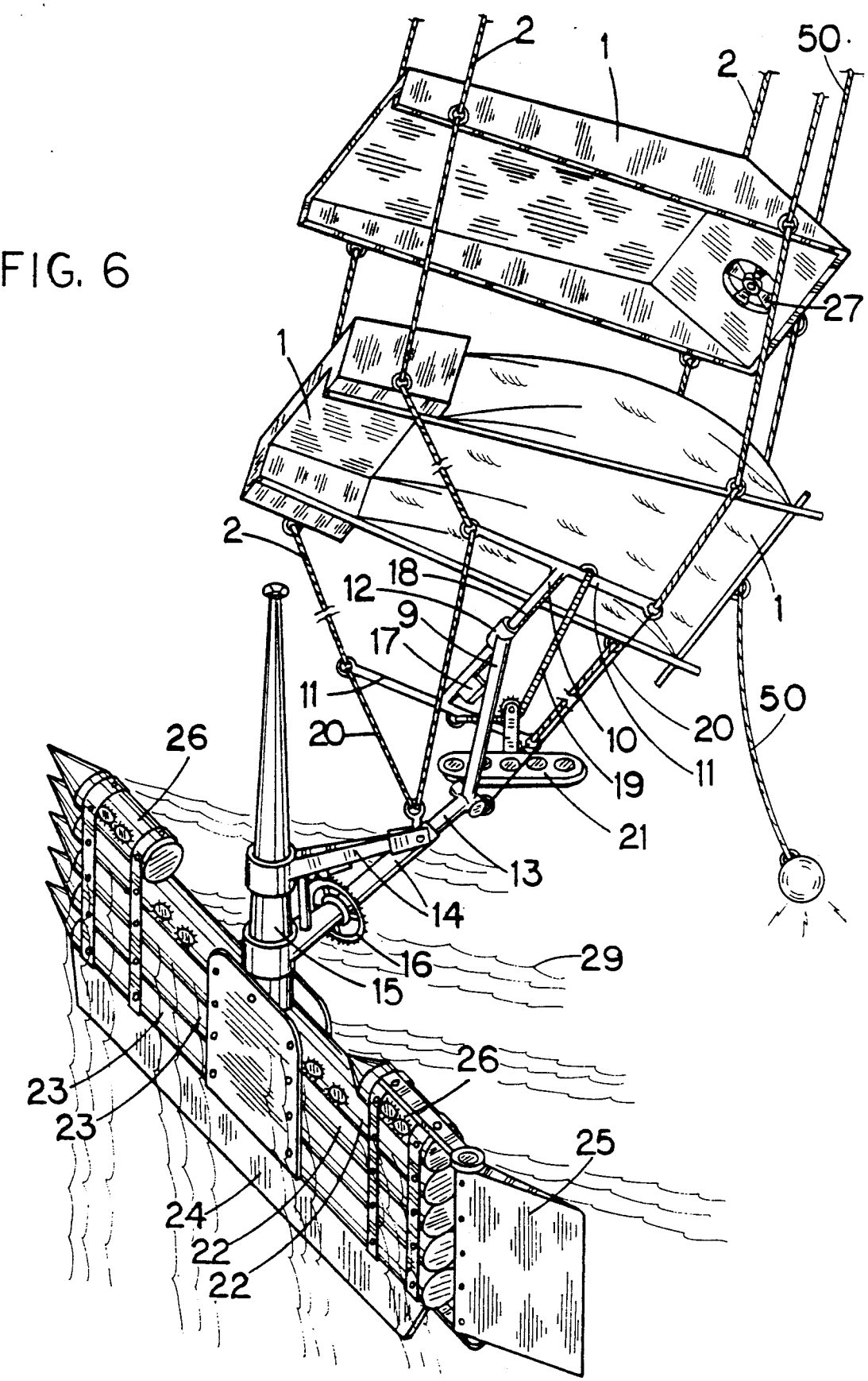
FIG. 6 illustrates how a Rein-Deer Kite may be alternatively built having a balloon at front end, light fabric for the body to rear end: how a boat may be constructed into a vertical stack single pile of pipes serving as a moving anchor that holds the control systems of the kite.

The rigid bar #10 sets apart the guide rope #2 at the same time stretches out the suspender Gear Chain #19 which suspends the air-borne passenger capsule #21 just below the lowest kite. The hoist #13 regulates the length of guide rope #2 in order to maneuver the kite. The pipe boat #22 carries a ballast pipe #23 that is filled up with water to serve as counter weight to prevent the anchor blade #24 from being lifted out of the water. It should be noted at this point that one of the most important part of this invention is the moving anchor blade #24 which is an elongated thin vertical wall or board that is heavy enough to make the boat up-right when the kite #1 is disconnected, and which bites and cuts thru the water at transverse or obliquely against the wind when pull by the kite #1 at tilted posture to the left or to the right of the wind current. Said blade #24 should always be submerged underwater to keep it biting into the water that is why the ballast pipe #23 that is filled up with water is provided to act as counterweight against the lifting power of the kite #1. The high light of this new technology is that the moving anchor blade #24 makes the kite #1 to cruise obliquely against the wind to unlimited distances or to cruise zigzag against the wind towards a definite destination. This moving anchor blade #24 may be made to be sliding on ice across the North Pole as being towed by the kite #1. The outer end of the horizontal bar #14 is tied down to the lower third point of the anchor blade #24 so that the pull force of the kite will be directed to the anchor blade below the boat, thereby, there will be no overturning effect upon the boat, in fact the boat #22 will be tilting away from the kite-sail #1 instead of tilting towards the kite. The length of bar #14 extending out from the side of the boat depends upon the hight of the boat #22 from the anchor blade #24 such that the mast #15 should be tilting away from the pull of the kite-sail. The mast #15 is provided to hold the kite during the start out or dismantling of the kite. The air-borne passenger capsule #21 is brought down to the boat by winding-in the lower control rope #2 into the power winch #13. Said winch #13 is powered by a battery that is rechargeable by a water turbine. The rudder #25 are operated by electric motor that are water proof as the boat #22, being 10% floating on still water, gets under the surfs. FIG. 6 illustrates an embodiment similar to FIG. 5 wherein the moving anchor for Rein-Deer Kite #1 is in the form of a boat made of pipes that has submarine capabilities parts #22 to #26. It is imperative that the pipes be arranged at a single vertical stock pile in order to minimize oscillation by the up and down movement of the water waves. Said boat, being vertically thin, can easily slice thru the waves serving as resistor-flat-wall thru the water against the sideward pull of the Rein-Deer Kite #1—resulting to a victor force that makes said thin boat to move forward very fast slicing thru the water. Such submarine capability and that the operator/passenger capsule #21 being up in the air, enables the Rein-Deer Kite to cruise across the ocean during stormy weather—anyway the passenger is not involved with the roughness of the ocean waves upon the boat. Capsule #21 may also be made into submarine boat to enable it to swim under water in case of emergency. Part 27 illustrates how a Rein-Deer Kite may carry a rotary type windmill (one or more windmills) that produce electricity which in turn will produce hydrogen gas while on cruise to supply the flying needs of the balloon kite #1 and for other needs. The Lightning-Arrester #50 is also provided to save the whole apparatus from being struck by a lightning volt, which is made of stranded aluminum cable wire conductor having float ball at the bottom end and having its upper end extended to the top of the upper-most level kite. Each kite should carry a segment of said cable wire conductor to distribute the load. FIG. 6 also illustrates how the kite #1 (lower level) may be constructed such that only the head is a balloon while cloth fabric to minimize expenses, any way the upper level kite will carry its rear end to the right position when there is no wind. Said fabric cloth kite can be parked in mid-air at a vertical position because of the balloon head.

FIG. 6 also illustrates how the said right-angle triangular control arm, part #13, #14, #15, may be constructed in the form of large tunnel pipes wherein the—passengers can walk thru to transfer places from the Capsule #21 to the pipe boat #22 and #26 and back. The Steering Wheel #16 is operated by an electric motor from the control panel at the Capsule 21 in order to maneuver the kites. It should be noted that the upward pull by the kite #1 upon the main "T" bar #9 will move the stong mast #15 to tilt away from the kite thereby making the thin boat #22 to #26 tilted to a slanted anchor-bite on the water against the sideward pull of the kite #1. Assembly #14 & #15 is a stabilizing lever-arm.

FIG. 6 also illustrates the detailed construction of the said pipe boat wherein part 22 may be made of a large pipe where some of the passengers can stay and move around that is provided with air/water-tight windows that can be submerged during violent weather. Pipes #23 may be smaller diameter which are filled up with water to prevent the whole boat from being lifted out of the water when the kites are blown upward by the violent weather winds and at the same time will act as a stabilizing lever-arm between the floater pipe #22 and the sinker-blade-wall #24. Sinker-Wall #24 must be heavy enough to pull down the bottom of the said boat against the upward float action of the Pipes #22 in order to make the mast #15 stay vertically erect against the splashes of the water waves when the kites are taken out. Part #25 is the Rudder Board used to maneuver the boat. Pipe #26 is a floater Buster pipe-Passenger Capsule on which the leverarm #14 & #13 may rest when the kites are taken out—wherein the "T" control structures #9, #10, & #11 will be tied up to the top of the mast #15. The weight of capsule #21 and the weight block #17 will tilt the kites left or right by moving the capsule along chain #19 and the weight block 17 along the straight gear #18. The array of kites carry the weight of the passenger Capsule 21 and that of the #9 to #14.

Figure 7:
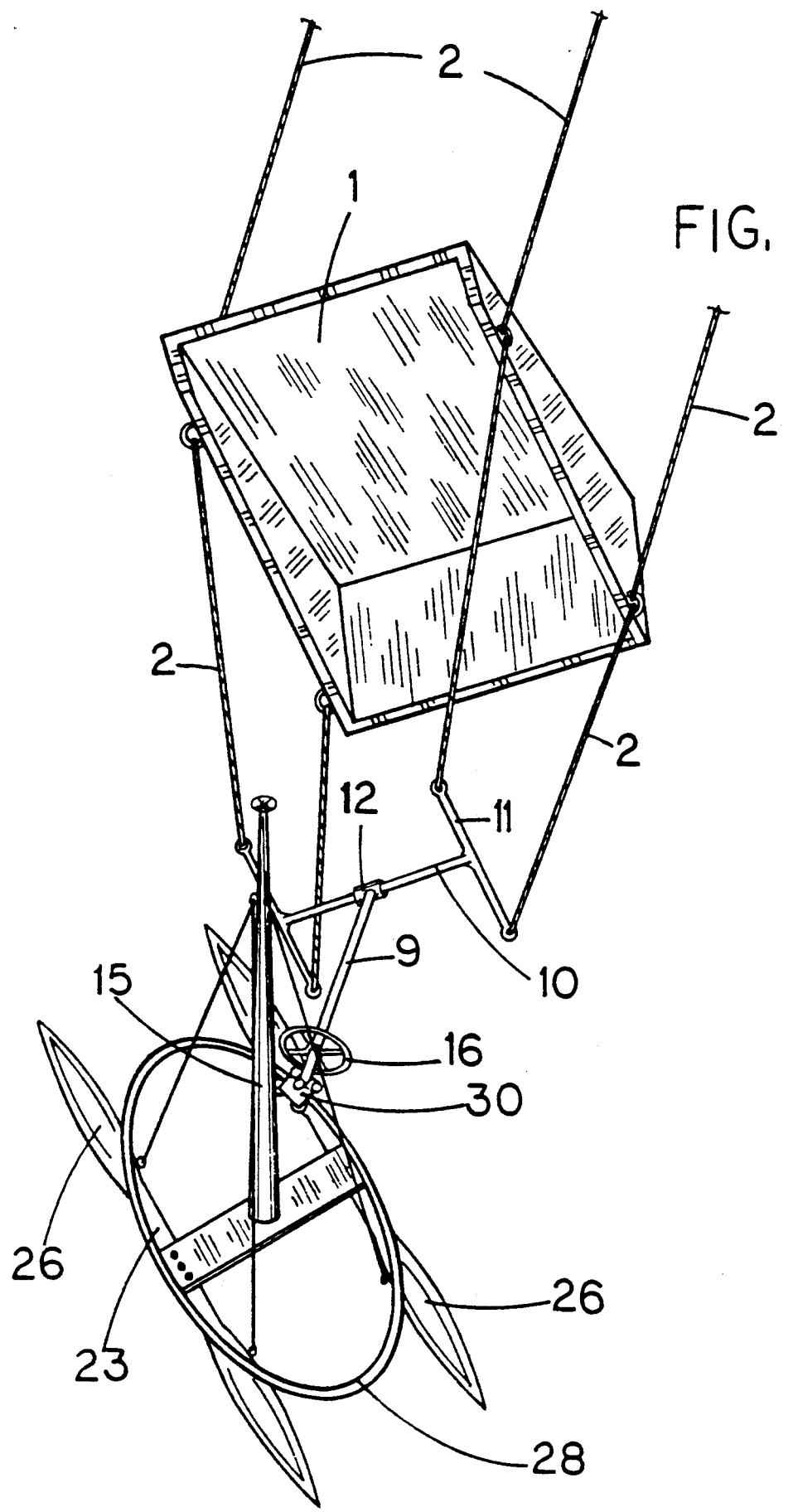
FIG. 7 illustrates how a circular/elliptical mono-rail track on an "H" frame boat serving as a moving anchor that holds the control systems of the Rein-Deer Kite.

FIG. 7 illustrates how a Mono-Rail Track (circular-/elliptical)#28 can replace the said Right-Triangle-Control Arm (parts 14, 13 and 15 in FIG. 6), which prevents overturning of the boat during stormy weather because the boat is being pulled up below its center of gravity. The main "T" control structure #9 is directly attached to the elliptical mono-rail by a Hook / Grip Roller Bearing #30 that is free to roll around the said rail when said boat turns around or makes maneuvers. Said rail #28 is securely attached to the double keel/-hull pipe boat at four equal spaced points. Said rail is made of structural steel "T"-Beam to make it a rigid control structure that is able to lift up the boat to the air. Said boat is made of integrated variable sizes of pipes such that the middle part is a small pipe #23 and the ends are large pipes #26 to move its buoyancy to the outer ends to minimize oscillation. A smaller diameter pipe filled up with water is attached underneath the pipes #26 and #23 so that the boat will not be lifted out of the water and carried away by the kite during violent weather. The smaller middle pipe #23 may also may be filled up with water to help prevent the boat from being lifted out of the water and to help minimize oscillation of the said boat by the water-waves.

Figure 8:
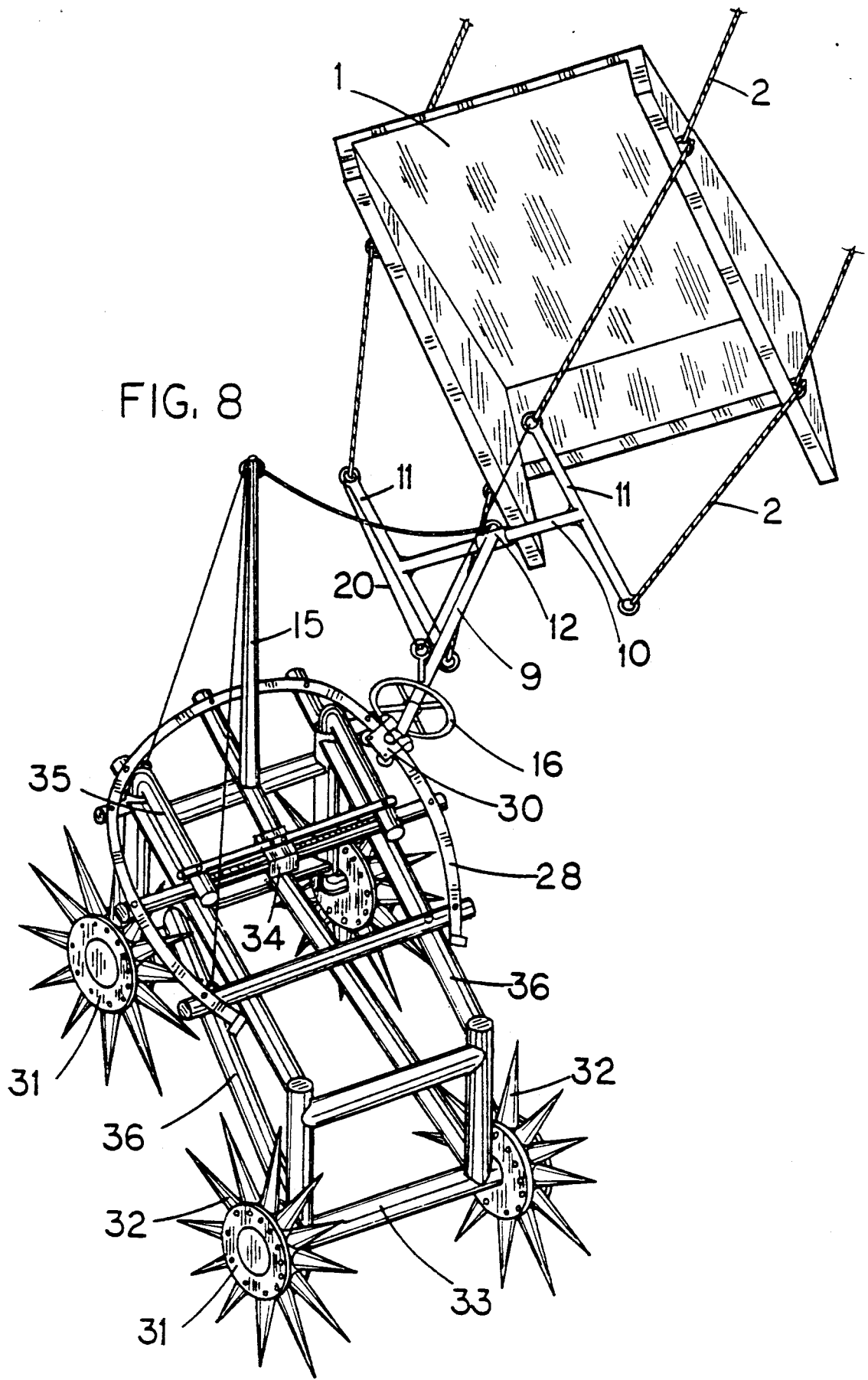
FIG. 8 illustrates a modified rear wall of the Kite; and how a forest-land Rover/Cruiser may be mobilized by the Kite.

FIG. 8 illustrates how a Rein-Deer Kite may be guided along a desired flight path over forest lands. The cart #31–36 is named "Tarantula Land Cruiser" having four wheels in the form of Rotary Spikes #31–#32 of at least 10 ft long that picks or make a bite to the ground like an anchor to prevent sideward dragging due to the side pull by the kite. The mono-rail #28 control structure does not have to be a complete closed ellipse because when the Hook-Roller #30 moves to the rear tip of the rail, the guide cart (Tarantula) will already run backward. The front wheels #31 are steered by electric motor #34 via the left and right movement of bar #35. Parts #33 and #36 are the main structures of the moving anchor cart. It is important to note that the Hook-Roller #30 will roll around freely on the said mono-rail when the cart turns around relative to the kite #1. To drive the cart back to the opposite direction, the cart must turn around towards the location of the kite and then turn to the opposite direction. It is important to note that the control mono-rail may also be constructed to be a complete closed ellipse or circle in order to increase the maneuverability of the cart. It is also important to note that this FIG. 8 illustrates an alternative design of the Rein-Deer Kite #1 wherein the deflection flap wall is vertically shorter than the side walls in order to permit air flow thru the kite to increase stability against side sweeping as the side walls are made wider.

Figure 9:
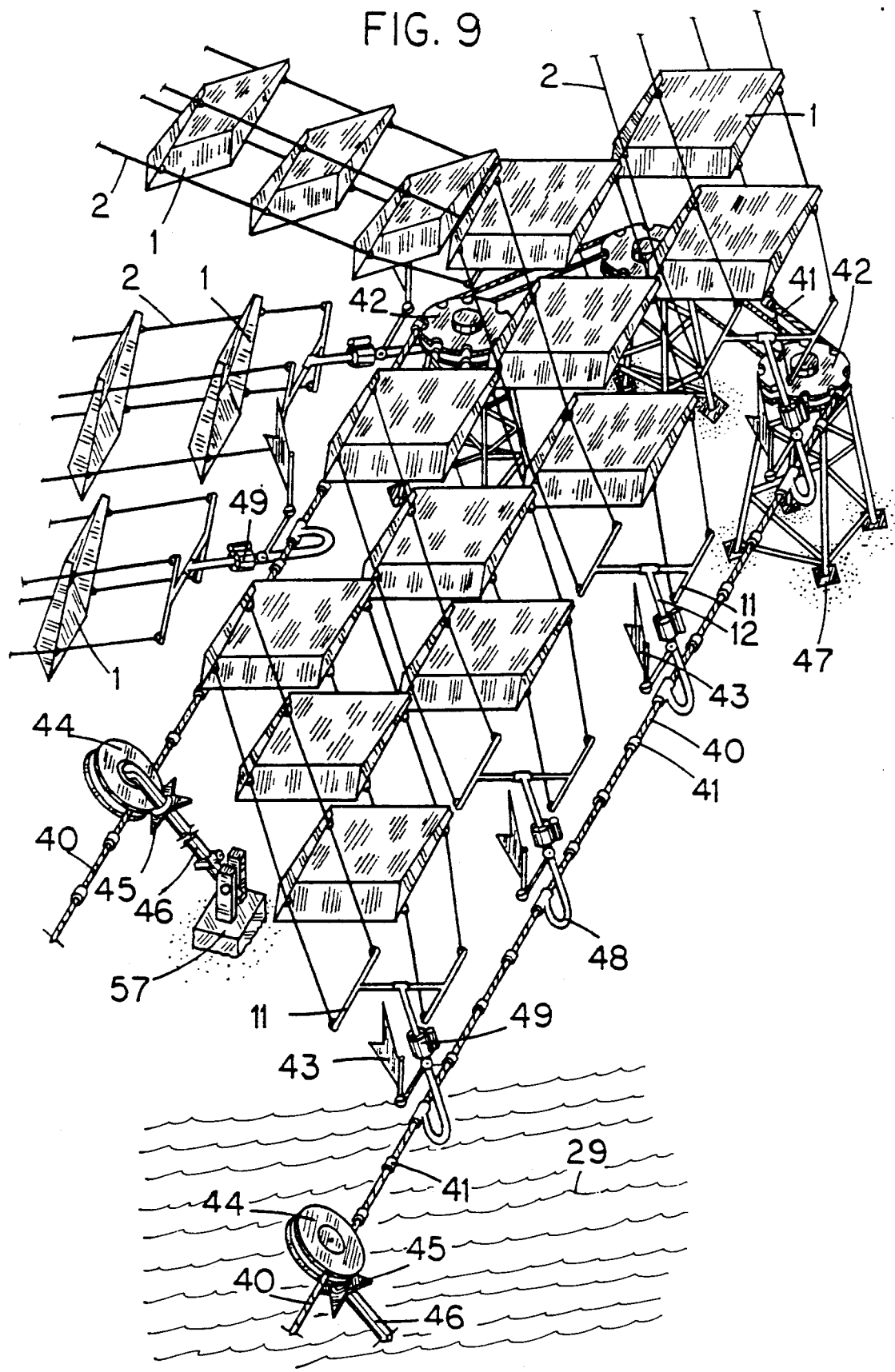
FIG. 9 illustrates the construction of a giant windmill mobilize by several multilevel Rein-Deer Kite.

FIG. 9 illustrates the simple construction of a giant windmill in the form of a single aerial Power Rope Chain in an elongated closed loop built over the sea or over the land that is powered by several multi-level Rein-Deer Kite that are made to function as large windsails. The Power Rope Chain #40 is held in place and stretched out full length by three Power Terminal Gears #42 at opposite ends of said loop. Said Power Chain #40 is held in place against vertical and lateral pull of the Rein-Deer Kites #1 by means of a roller pulley #44 that anchored to the ground footing or anchored to the ocean floor by cable wire hanging from a buoy. The lock-gear #45 that is freely rotating on a bearing at the anchor bar #46 is provided to prevent derailment of the said Power Chain #40 from roller pulley #44. Part #43 is a wind actuated electrical switch to activate the Steering Motor 49 to maneuver the kites #1 as they turn around at the terminal station #42 while the rigid flag #43 always stay with the direction of the wind. As the kites #1 will be flying obliquely with the wind, the kites will be pulling the Power Rope Chain #40 out of the energy taken from the wind to one direction and to the opposite direction after turning around the terminal gears #42. The drive teeth #41 and #48 will drive the notches of the power Gears #42 thereby producing a mechanical energy in action at the terminal station. Said Power Gears #42 at both ends of the said elongate loop collect the energy from the Power Chain #40 and drive a compressor, an electric generator, or a large water pump to produce elevated water. The inter-gear chain #41 is provided to collect energy from each of said terminal gears in order to remove concentration of forces upon one gear only. As an alternative method of maneuvering or repositioning the kites to the requirements of the windmill, it would be easy to adopt the traveling weight #17 thru a straight gear along the horizontal bar #10 of the main "T" control structure, as illustrated in FIG. 6 and has been discussed under FIG. 5. It will also be convenient to provide electric power to every individual maneuvering motor #49 by means of a Rotary Windmill 27 carried up in the air by some of the kites 190 1, per FIG. 6 & 10.

Figure 10:
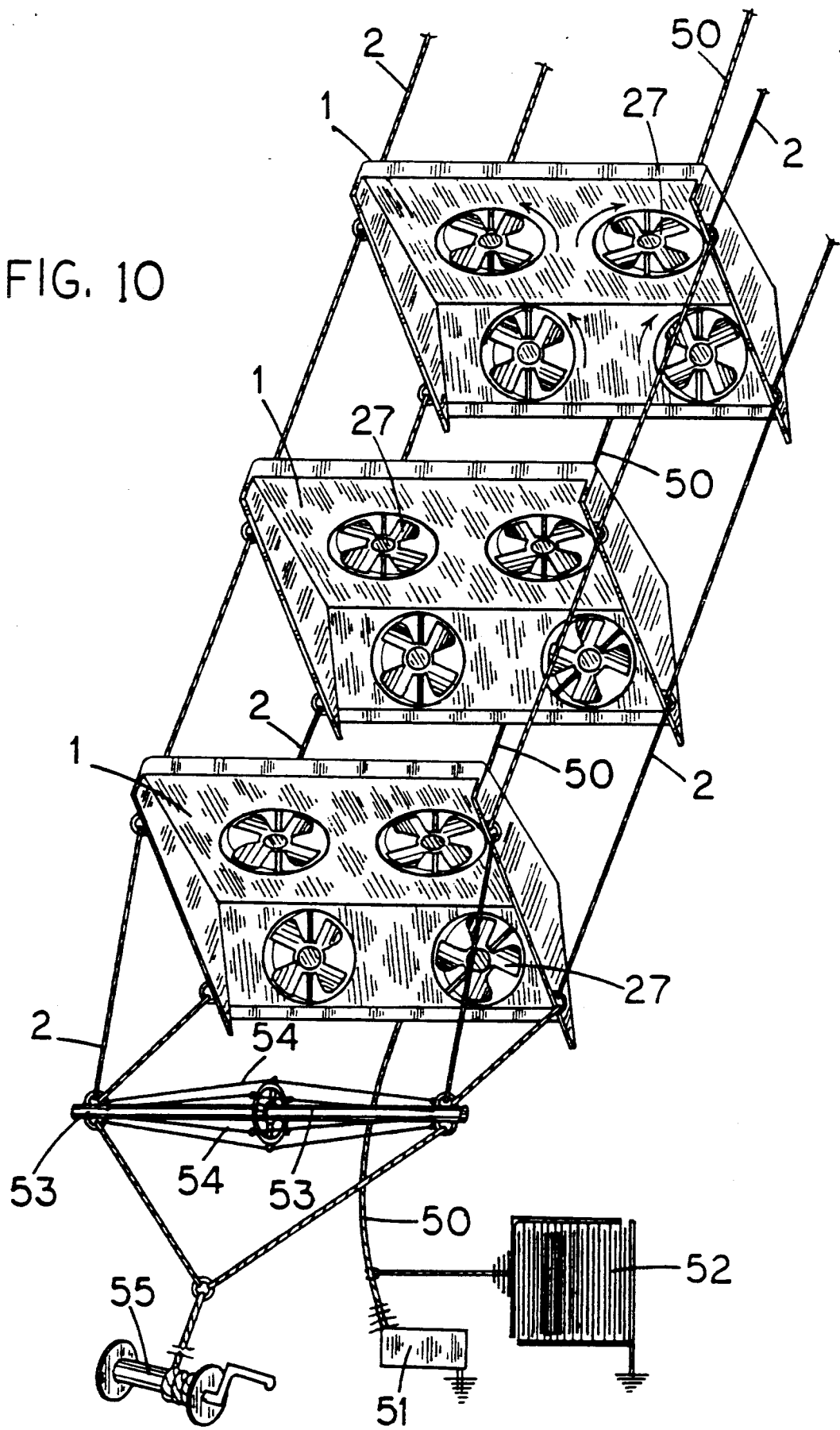
FIG. 10 illustrates how a rotary windmill may be stationed up in the sky.

FIG. 10 illustrates a method of collecting wind energy from higher altitudes by flying an array of multi-level kites #1 from near the ground to the highest altitude of available wind, wherein each kite carry into the sky at least four (4) or more Rotary Type Windmills #27, each one drives a compressor or an Electric Generator and the converted energy is then transmitted down to gound level for usage or storage. Horizontal bar #53 is needed to set apart the control rope #2. String #54 are needed to make bar #53 rigidly stiff. The aerial wire conductor #50 is needed to act as Lightning Arrester to protect the apparatus from being struck by lightning, and to collect electrical energy from the clouds for use in running the electrolyzer the production of hydrogen gas fuel or for the production of steam, and other uses. The Large Condenser #52 is needed to store sudden surges of electric energy from the clouds in order not to overload the electrolyzer #51. This is a new invention for collecting electric energy from the clouds.

Figure 11:
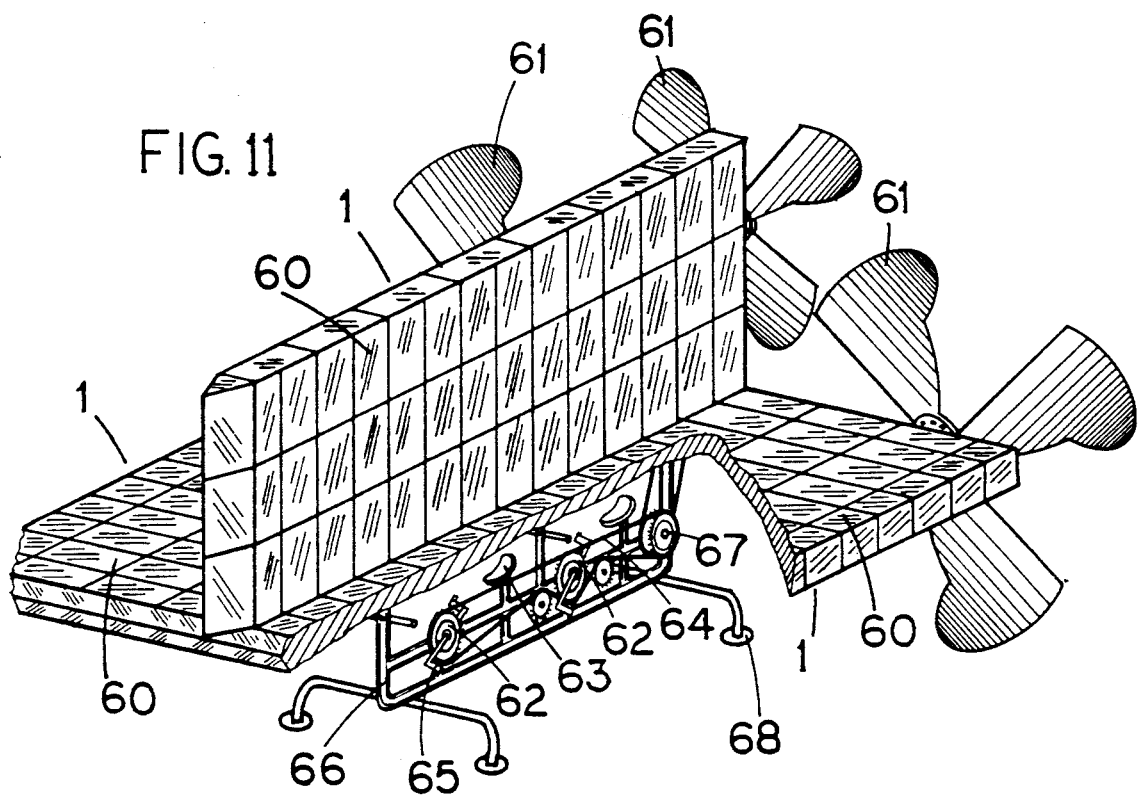
FIG. 11 illustrates how a Rein-Deer Kite may be built into a sky Bike that can be mobilized by Solar Cells.

FIG. 11 illustrates a Rein-Deer Kite used as an aircraft which is in the form of a sky-bike consisting of a large rectangular horizontal flat balloon #1 with its front side made into a thin edge to split the air easily and gain speed, and another the same kind of flat balloon #1 that is vertically connected across the center top of the first horizontal flat balloon to provide vertical stability as it will be pulling upward against the downward weight of the passenger directly below it. Part #63 is provided to serve as seat for the passenger who puts in power to the mechanism #62, 64, 65 that drive the rotary propellers #61 which can be shifted to reverse rotation individually and separately in order to maneuver said aircraft. Parts #66 serves as frame to make the balloon flat and to serve as reservoir tank to store hydrogen/helium gas to inflate the balloon when floating it up and to deflate the balloon when moving it down. A piston compressor pump is provided and drivable by the passenger to withdraw gas from the balloon and to store said gas into said pipe structures of said balloon. Solar Cells #60 are also provided and attached on all upper and outer surfaces of said aircraft to produce electric power that drives the propellers #61 in order to help out the passenger fly the aircraft during day time. Said rotary propellers #61 are also made of honeycomb balloons that float up in the air in order to remove its weight.

It should be noted also that said flat balloon may be more simply constructed by making said adjacent individual gas containers to have common internal side walls to minimize accumulated weight of materials getting into the construction. Said balloon-kite may also be constructed into a flat balloon by using an envelope gas container (without using small individual gas containers, or not a honeycomb type), the top sheet of which is tied to its bottom sheet by regularly spaced strings that have wide round bearing sheets and buttons on both ends—a construction similar to a bed cushion, the length of said strings depending upon the desired thickness of said flat balloon.

What I claim for which protection by a Letters Patent is applied for, are as follows:

1. A lighter than air inflatable device, comprising:

A plurality of flat generally rectangular kites assembled into a vertical array to function as a wind sail;

Each kite being formed with left and right trapezoidal walls extending downward at sides of a flat main body portion and each kite being formed with a deflection flap;

Each pair of left and right walls active as aerodynamic stabilizers to form a concave face with the body for stability and lift;

Each deflection flap attached to the rear of each kite body to provide lift;

Each kite including the body, walls, and flap being formed of binding means surrounding a honeycomb array of containers inflated with light gas to further provide lift;

Control ropes connecting the kites together at their corners in an evenly spaced manner;

An anchor; and,

Each binding means being in the form of strings or straps which form a net structure to entrap each honeycomb array.

2. An inflatable device in accordance with claim 1, wherein said kite is made to serve as an air-borne transportation by making it carry an air-borne passenger capsule, and wherein said anchor is moving as being towed by said kite, transversely or obliquely against the wind, comprising:

A single or an assembly of multilevel vertical array of kites geared to function as an air-borne sail;

A passenger capsule carried air-borne by each kite or by the kite on the lowest level of said array;

A triple "T" control structure said control ropes, and to maneuver said kites;

Said "T" control structure being in the form of a lower vertical main "T" structure that holds and manipulates the upper auxiliary left and the right horizontal "T" structure that have horizontal left and right cross-arms;

A horizontal right triangle control arm to hold the bottom end of and to manipulate said main "T" control structure;

A 90% submerged mono-hull boat having a center vertical mast that serves as the vertical leg of said triangular arm;

A calibrated ballast pipe, filled up with water, horizontal and longitudinally underneath the keel of said boat;

A longitudinal thin wall blade disposed along the bottom of said boat to serve as a moving anchor under water;

A rudder at each front and rear end of said boat to maneuver the flight path of said kite;

An adjustable auxiliary control rope to tie down the front end of the horizontal cross-arm of the auxiliary left and right horizontal "T" control structures to fix the angel of flight elevation of said kite;

A steering wheel to tilt the kites to the left and to the right thru said triangular control arm and thru said triple "T" control structure;

Said steering wheel being operated by remote control system from the said air-borne passenger capsule;

A power winch that is engaged with the chain that suspends the said passenger capsule to move the said capsule to the left or to the right in order to tilt the said kite left or right.

A traveling weight moving along the horizontal cross-arm of the said main "T" control structure to help tilt the kite left and right;

A storage battery, being charged by water turbine under the said boat, to drive the control system by remote control;

A compressor pump to mobilize light gas to and from said balloon kites; and,

A remote control panel, inside the passenger capsule, to manipulate the control system.

3. An inflatable device in accordance with claim 1 or claim 2, wherein, for the same purpose of making the said kite into an air-borne transportation, the control system is simplified by joining together the two control ropes on the left side to form a sling and do the same to the control ropes on the right side of the said kite in order to fix the angle of its flight elevation, thereby only one control rope on the left and one control rope on the right is tied down directly to the said moving anchor, comprising:

A single or an assembly of multi-level vertical array of kites geared to function as an air-borne sail;

A passenger capsule carried air-borne by each kite or by the kite on the lowest level of said array;

A sling control rope on the left and on the right side of each kite;

A single control rope on the left and on the right interconnecting the said left and the right sling control rope of each kite, to form a vertical array;

Said left and right single control ropes are each tied down to the front and rear end of said moving anchor assembly, the length of each being altered by winch to tilt said kite;

A front and rear control bar disposed horizontally on the top ends of and extending out perpendicularly from said moving anchor assembly;

Each of said front and rear control bar holds the bottom end of the said left and the right single control rope;

A moving anchor assembly, cruising forward/rearward, comprising: A heavy thin wall blade longitudinally disposed underneath said assembly to resist side drifting, and as a ballast;

A calibrated ballast pipe, permanently containing water, to serve as counter weight and to which said wall blade resistor is attached underneath;

A 90% submerged floater pipe attached to the top of said ballast pipe to hold said blade from sinking and to serve as reservoir for light gas, and to hold the control ropes of the kite thru said horizontal control bars;

A remote controlled rudder disposed at the left and at the right ends of said moving anchor Said pipes being pointed on both ends;

A vertical mast on top center of said anchor assembly;

A rechargeable storage battery; and,

A water turbine at both or either end of said ballast pipe, to produce electricity.

4. Inflatable device in accordance with claim 1 or claim 2 wherein said array of kites is provided with lightning arrester, and wherein said moving anchor is a combination of stack pile of large pipes to form a large wall blade, and wherein the floater pipes are in the form of passenger capsules, comprising:

A single or an assembly of multi-level vertical array of kites geared to function as an air-borne transportation;

An air-borne passenger capsule being carried by the kite on the lowest level of said array;

A lightning arrester in the form of an electric wire conductor, made of light materials, being suspended up vertically by the highest level kite and b/ each of the lower level kite in array;

A single or a plurality of floating balls attached to the lower end of said electric wire conductor to prevent said wire from sinking down to the deep ocean.

aid floating balls being partially filled up with water to prevent said wire from being lifted out of the water by the kites;

A control system for the kites in the form of said Triple "T" and said right triangular arm control structures;

A 90% submerged moving anchor assembly in the form of a stack of large pipes with said heavy thin wall blade resistor against side drifting, and to keep said stack upright;

Said stack of pipes being held to a vertical posture on the water by a large mast that forms part of said right triangular control arm;

Said large mast being provided with a large strap at its bottom to take hold of the said large pipe in a stack formation;

A short large floater pipe, as passenger capsule, added on both top ends of said stack;

Said stack of pipes being comprised of large float pipes at the top that serve as passenger capsule and the lower pipes being filled up with water to serve as ballast to prevent said moving anchor from being lifted out of the water by the kites;

A plurality of rigid bar straps to bundle said stack into a flat vertical wall;

A caudal tail or rudder being manipulated by remote control from the said air-borne passenger capsule;

A rotary blade windmill being carried up in the sky by each kite to generate electricity to recharge the battery installed inside said moving anchor assembly;

Said triangular arm structure being made of large pipes to allow the passenger to walk thru it in transferring from the said air-borne capsule to the said float pipes on the water and vice-versa, An air conditioning unit to make said pipe passenger capsules comfortable as living quarters.

5. An inflatable device in accordance with claim 1 or claim 2, wherein the control system of said kite is in combination with elliptical or circular mono-rail track connector that holds the bottom tip of said triple "T" control structure and wherein said elliptical mono-rail connector is disposed horizontally on top center of a mono-hull or a double-haul boat serving as the moving anchor, comprising:

A single or an assembly of multi-level vertical array of kites geared to function as an air-borne transportation;

An air-borne passenger capsule carried by each or by the kite on the lowest level of said array;

A control system for the kites, in the form of said Triple "T" control structure, to maneuver said array of kites;

A hook roller bearing assembly, to hold the bottom tip of said Triple "T" control structure;

An elliptical/circular mono-rail track upon which said hook grip roller bearing assembly rolls around in accordance with its varying orientation with said kite;

Said hook roller bearing assembly may be in the form of plurality of roller wheels assembled to make a hook-grip around the top flange of said track;

Said elliptical mono-rail track being in the form of a curved pipe or a curved wide flange I-beam;

A moving anchor assembly in the form of a 90% submerged floater pipe boat (mono-hull or double hull) with an underneath longitudinal thin wall blade that resist against the sideward pull of said kite-sail;

Said floater pipes being substantially enlarged at both third ends and its middle third being permanently filled up with water while in use, in order to minimize undesirable oscillation by the surfs;

Said floater pipes being pointed on both ends;

A ballast pipe filled up with water disposed underneath said floater pipes;

Said elliptical/circular mono-Rail track being horizontally disposed on top of said boat squarely with the mast in such firmness that it may carry the whole boat out of the water by the lifting power of the kites;

A remote controlled Rudder disposed at both ends of said boat as said boat may cruise forward and rearward; and, A mast to take hold of the kite during the start out and during the retirement of said kite.

6. An inflatable device in accordance with claim 1 or claim 2, wherein the said moving anchor is in the form of Rotary Spike Assembly that is used as wheels for a cart that guides the flight path of said kite on forest lands and on ice lands, to make use of said balloon kite into an air-borne transportation over the land, comprising:

A single or an assembly of multi-level vertical array of kites geared to function as an air-borne sail or as an air-borne transportation;

A air-borne passenger capsule being carried by each or by the kite on the lowest level of said array;

A control system for said kites in the form of said Triple "T" control structure, the said hook roller bearing assembly and said elliptical mono-rail track, all in one assembly;

A moving anchor to guide the flight path of said kite over the land, forest, or across ice regions, comprising: A plurality of rotary spike wheels that pick and bite into the ground while rolling;

A structural cart to take hold said rotary spike wheels and to steer same, and which also take hold said elliptical mono-rail track;

Said rotary spike wheels being steerable by electric motor under remote control from said kite;

A mast to take hold of said Triple "T" control structure when the kite is taken out.

7. An inflatable device in accordance with claim 1 or claim 2 wherein a plurality of said multi-level vertical array of kites are attached, at even spacing, to a moving anchor that is in the form of an elongated closed-loop aerial rope/chain thereby forming a giant windmill, comprising:

A plurality of an assembly of multi-level vertical array of kites geared to function as an air-borne sail;

A control system for each said vertical array of kites to make it act as one sail, in the form of a triple "T" control structure, comprising:

(a) A vertical main "T" control structure having a "U" connector at the lower end of its vertical bar;

(b) A steering gear joint that is electrically operated at the mid-section of said vertical bar of said main "T" control structure to maneuver said kite-sail;

(c) A wind-actuated electrical switch in the form of a rigid flag attached below said gear joint to energize said steering motor;

(d) An electric steering motor to drive said steering gear joint;

(e) An auxiliary horizontal "T" control structure at the top left end of said vertical main "T" structure to hold and control the two control ropes at the left side of said array of kites;

(f) An auxiliary horizontal "T" control structure at the top right end of said vertical main "T" structure to hold and control the two control ropes at the right side of said array of kites;

(g) A rechargeable dry cell battery to energize said steering motor;

(h) A rotary blade windmill carried up in the sky by said kite to recharge said battery;

(i) A cross-hinge joint to connect the end of said "U" hook to its clamp on said aerial rope/chain;

A moving Anchor in the form of an elongated closed loop aerial rope chain to which said "U" connector of said main "T" control structure is connected by a clamp that is crimped or welded onto said chain;

Said aerial rope/chain may be in the form high strength stranded steel wire rope, hereby named power chain;

A plurality of steel nuts crimped or welded around said aerial steel rope, at even spacing, to provide gear teeth to it and enable it to drive gear wheels;

A set of three terminal gear wheels that is driven by said power chain in a half-hexagonal formation at least 200 feet apart or a set of two gear wheels disposed at least 500 feet apart perpendicular to the main length of said power chain, in order to hold and stretch out said power chain at each opposite end loops;

Each terminal gear wheel being set on concrete footings or on top of towers or posts on land or floating on the ocean;

A hook roller pulley that holds in place said power chain by its lower lips, which is disposed vertically with a roller bearing;

An elbow bar, having a horizontal short upper arm that holds the said hook pulley and, having a vertical long arm connected to an anchor on the ground or on the ocean;

A four-toothed lock gear that is free to rotate on a bearing fixed below said hook pulley by using the lower vertical arm of said elbow bar as its axle.

Said lock gear having long teeth and set closed to the bottom lips of said hook pulley to prevent its derailment from said power chain;

A vertical tie rope, of at least 50 feet or more, to tie down the lower end of said elbow bar to the ground anchor or to an anchor floating out on the ocean, to make said power chain stay moving high above orchard forest, above houses, above Power Lines, and high above navigation channels;

A buoy floating on the ocean tied to an anchor on the ocean floor, to serve as tie point for said hook pulley;

A 90% submerged floating terminal station, that carry said terminal gear wheels out on the ocean, to hold and stretch out said power chain over waters;

An anchor on the ground or on the ocean floor to hold said terminal gear wheels and the said hook roller pulley against the lifting pull of said power chain;

Said anchor being in the form of, but not limited to, bars horizontally buried underground, or rock sausage sunk down to the ocean floor, or bars drilled to existing rocks;

An inter-gear chain to synchronize and to collect energy from each of the set of three terminal gears at each terminal station, in order to balance the mechanical forces among said gears and to concentrate energy to the power shaft of the center terminal gear;

A power take-off gear attached to said power shaft;

A multi-speed transmission gear driven by said power take-off gear;

A power shaft bar, driven by said multi-speed transmission gear, having three power output pulleys/gears, to drive (on and off) an electric generator, a compressor, and a water pump to produce storable energy, such as electricity, compressed air and elevated water.

8. Inflatable device in accordance with claim 1, wherein said vertical array of kites is tied down to a fixed anchor, and wherein each said kite carry a plurality of rotary blade windmills up in the sky to produce electricity or compressed air, and wherein said array of kites carry a lightning arrester that brings electricity to equipment on the ground, comprising:

A single or multi-level vertical array of kites tied down to a fixed anchor on the ground;

Each kite having a plurality of circular holes;

A rotary blade windmill disposed on said circular holes on each kite;

A compressor or an electric generator driven by each said windmill in the sky;

An air hose or an electric wire to collect energy from said windmills;

A built-up strut bar having peripheral strings disposed below the lowest kite to set apart the control sling ropes of said kite;

Said control rope being reduced to a single anchor rope;

A winch to bring down or send up said kites thru its anchor rope;

A lightning arrester in the form of an aerial electric wire rope carried by all the said kites from top level to the lowest level kite, each kite having a share to carry the weight of said wire;

Said aerial wire conductor being further used to collect electricity from the clouds for use in running the electrolizer and other uses on the ground;

A large condenser to store sudden surges of electric energy from the clouds to prevent overloads to the equipments, 9. An inflatable device in accordance with claim 1, wherein a single kite (without anchor) has no peripheral walls, but instead, a longitudinal wall at the center top of said rectangular horizontal main body is provided to produce a central vertical lifting power, and further provided with manually driven propellers, in order to make said kite into a sky-bike and/or to serve as an air-borne transportation, comprising:

A horizontal flat balloon to serve as main body of said sky-bike;

A longitudinal vertical wall balloon attached on the center top of said main body to add more lifting power and stability;

A plurality of rotary blade propellers having clockwise and counter clock-wise rotation to drive said flat balloon in mid-air forward and rearward and to turn around;

Said propeller blades being made of flat balloons to make them weightless;

A foot pedal and a passenger seat in order to drive said propellers by manual labor;

A passenger capsule to enclosed said seat and pedals;

A plurality of solar cells disposed on top and side surfaces of said balloon to help drive said propellers;

A piston compressor pump drivable by the passenger to withdraw and to store the light gases in order to deflate and bring down said balloon.

Said passenger seat and passenger capsule being framed with large but light pipe structures that also serve as storage pipes for the light gas going into and from said balloons.

10. An inflatable device in accordance with claim 1 or claim 7, wherein the moving anchor of said vertical array of kites is in the form of a hook-roller bearing Assembly that runs thru an elongated closed-loop mono-rail track on the ground or on top of posts, wherein said hook-roller pulls an elongated closed-loop power rope chain of the same length as said rail-track, in order to form a giant windmill, comprising:

A plurality of said multi-level vertical array of kites geared to function as air-borne sail;

An elongated closed-loop Mono Rail Track, transverse to the wind, set on the ground or on top of posts;

A moving anchor in the form of a hook-roller bearing assembly that runs thru said mono-rail track to hold each said array of kite sail;

An elongated closed-loop power rope chain, being pulled by each said moving anchor;

A set of three (3) terminal gear wheels, driven by said power chain, horizontally disposed at each of the opposite end loops of said rail track, to hold and stretch out said power rope chain, to form a windmill:

A power take-off gear at each terminal gear wheel shaft.

11. An inflatable device in accordance with claim 1, wherein a plurality of light gas containers (lifter balloons) are attached to the top of a wide framed sheet of light fabrics/plastic sheet to make an integrated large flat balloon kite that lifts loads without the assistance of the wind, comprising:

- A kite, made of fabrics or plastic sheets, framed to have wide face, downward trapezoid side walls, and a deflection flap at the rear to make it concave to the wind;
- A network of strings on top of said sheets of fabrics to serve as reinforcement to the fabrics;
- A rectangular frame to stretch out said fabrics and strings for the main body, walls, and the flap;
- A plurality of large containers, inflated with light gas, tied to said frames and strings on the top of said kite, to provide lifting power;
- A sling control rope on the left side and a sling control rope on the right side of said kite;
- A single downward control rope to anchor said sling rope on the left side and do the same on the right side, and,
- A plurality of strings, attached in rows to the bottom face of said kite, to tie down said face to said sling ropes against the upward lift of said balloons and against the upward wind pressure.

12. An inflatable device in accordance in with claim 1, or claim 3, or claim 5, wherein said kite serves as an air-borne tractor to pull carts running on rail tracts, to pull loads hanging on aerial cable railway, to pull icebergs and other materials floating on waters.

13. An inflatable device in accordance with claim 1 or claim 2 or claim 3, wherein said "T" control structure is modified to be in the form of one "T" only, such that its horizontal cross-arm is just a simple bar that holds the single left and the single right control rope of said kite correspondingly, to effect tilting of said kite to the left and to the right.

14. An inflatable device in accordance with claim 1, wherein said honeycomb array of light gas containers have common internal side walls to minimize said binding means, and to minimize sheeting materials and weight getting into its construction.

15. An inflatable device in accordance with claim 1, wherein said flat balloon kite is made up of an envelop type of gas container (not a honeycomb), in which its top sheet is tied down to its bottom sheet by evenly spaced strings or straps glued to the internal face of said sheets, or said string having wide buttons on both ends, to make a flat faced balloon.

16. An inflatable device in accordance with claim 1, wherein a plurality of truss structure of light material in an inverted "U" is adopted as frame to hold said honeycomb array into a flat arrangement; said truss being formed with the said binding means serving as the tension chord of said truss.

17. An inflatable device in accordance with claim 1, wherein the said honeycomb array of light gas containers are pressed towards each other to form the compression chord of said truss.

18. An inflatable device in accordance with claim 1, wherein a multi-layer of networks of strings or straps is adopted to entrap each honeycomb balloon to form a larger and thicker flat balloon kite.

19. An inflatable device in accordance with claim 1, wherein a plurality of tiny balloons are set free inside each individual gas container to serve as an automatic patch-up for gas leaks created by gun shots, each gas container being provided with gas supply valves that automatically shut-off in case said balloon break-up and a corresponding gas hose to supply/withdraw the light gas.

20. An inflatable device in accordance with claim 1, wherein said side walls are extended beyond the rear end of said kite to add aerodynamic stability.

21. An inflatable device in accordance with claim 1, wherein the said deflection flap may vary in vertical depth and in angle of inclination to adjust it to the lifting needs of said kite.

22. An inflatable device in accordance with claim 1, wherein said truss frame of said kite is removed, and instead, the bottom face of said kite is tied down, against the upward wind pressure, to its main control ropes by a plurality of strings evenly spaced in rows lengthwise and cross-wise, to make its face generally flat against the wind.

23. An inflatable device in accordance with claim 1, wherein only the front section of said kite is inflated with light gas and a larger rear portion of its body is in the form of a plain wide sheet of light cloth or plastic.

24. A device in accordance with claim 1, wherein, in the said vertical array of multi-level kites, only the upper level kites are inflated balloons and the lower level kites are just plain framed light cloth or plastic sheets.

25. An inflatable device in accordance with claim 1, wherein the four corners of a one level kite are directly anchored to the ground at low elevation to make said kite serve as a roof or a tent that has no post.

26. An inflatable device in accordance with claim 1, wherein the side walls and bottom face of said kite are painted with pictures and letterings to serve as advertisement billboard while flying anchored to a store or office, or flying across the sky, or to be used as a blimp balloon that carry high power lamps, or said kite being used to carry high altitude instruments.

* * * * *